United States Patent [19]

Kraemer

[11] Patent Number: 5,581,271

[45] Date of Patent: Dec. 3, 1996

[54] HEAD MOUNTED VISUAL DISPLAY

[75] Inventor: Werner Kraemer, Conklin, N.Y.

[73] Assignee: Hughes Aircraft Company, Los Angeles, Calif.

[21] Appl. No.: 349,259

[22] Filed: Dec. 5, 1994

[51] Int. Cl.⁶ .................................................. G09G 3/02
[52] U.S. Cl. .............................. 345/8; 340/980; 359/630
[58] Field of Search ........................... 345/8, 7; 348/115, 348/56; 340/980; 359/630, 201, 631, 13, 14

[56] References Cited

U.S. PATENT DOCUMENTS

| | | | |
|---|---|---|---|
| 4,269,476 | 5/1981 | Gauthier et al. ............................. | 345/8 |
| 4,636,866 | 1/1987 | Hottori ...................................... | 348/56 |
| 4,869,575 | 9/1989 | Kubik ......................................... | 345/8 |
| 4,968,123 | 11/1990 | Fournier, Jr. et al. .................. | 359/630 |
| 4,994,794 | 2/1991 | Price et al. .............................. | 340/980 |
| 5,093,567 | 3/1992 | Staveley ...................................... | 345/8 |

Primary Examiner—Jeffery Brier
Assistant Examiner—Doon Chow
Attorney, Agent, or Firm—Jeannette M. Walder; Wanda K. Denson-Low

[57] ABSTRACT

A head mounted visual display for simulation and training that provides to a user a high quality real time video image and a see-through view of the surrounding real world when the video image is off. The display system provides a CRT collimated visual image of high resolution and image quality that has high light transmissivity, anti-luning, and a wide-angle view. The CRT has a fibre optic face plate to reduce CRT mapping distortions.

5 Claims, 5 Drawing Sheets

HEAD MOUNTED VISUAL DISPLAY

BACKGROUND OF THE INVENTION

1. Field of the Invention

This invention relates generally to a head mounted visual display for simulation and training that allows the user to see high quality, real time computer generated images and a see-through view of the real surrounding world. Specifically, the invention relates to a helmet mounted display that has a CRT visual image that is collimated, of high resolution and image quality with improved optical features including high light transmissivity, anti-luning, and a wide, instantaneous field of view (80°) for enhanced realism.

2. Description of the Prior Art

The use of visual displays to provide real time, digitally generated images on a cathode ray tube (CRT) or liquid crystal display (LCD) for simulation and training purposes is known in the art. In recent years, a variety of helmet mounted visual displays have been provided. Aircraft cockpit heads up displays (HUD) and other types of helmet mounted optic systems for use in aircraft by pilots for target acquisition and other purposes are known.

U.S. Pat. No. 3,205,303, issued Sep. 7, 1965 to Bradley, shows a remotely controlled remote viewing system, a portion of which is attached to a helmet. U.S. Pat. No. 3,833,300, issued to Sep. 3, 1974 to Rymes, shows a three-dimensional weapon site using a helmet and visor. U.S. Pat. No. 4,001,499, issued Jan. 4, 1977 to Dowell, shows a display system used in an aircraft. A helmet mounted head-up display is shown in U.S. Pat. No. 4,153,913, issued May 8, 1979 to Swift. U.S. Pat. No. 4,761,056, issued Aug. 2, 1988 to Evans et al., shows a compact helmet mounted display. A fibre optic coupled helmet mounted display system is shown in U.S. Pat. No. 4,743,200, issued May 10, 1988 to Welch and LaRussa. U.S. Pat. No. 5,143,521, issued Jul. 28, 1992 to Lacroix et al., shows a wide-angle display device for a compact simulator. A helmet mounted area of interest display is shown in U.S. Pat. No. 5,320,534, issued Jun. 14, 1994 to Thomas. U.S. Pat. No. 5,348,477, issued Sep. 20, 1990 to Welch et al., shows a high definition television head mounted display unit.

One of the great drawbacks of current helmet mounted displays for simulation and training is that the visual display device itself optically blocks the user from observing the real world environment surrounding the user, which greatly limits the user's interaction with real world objects such as an aircraft cockpit, aircraft cockpit instrumentation and synthetic flight training controls. For example, a high level flight simulator has a complete realistic cockpit, including instrumentation, stick and throttle controls, gyro and navigational displays. If the user's helmet mounted display blocks the view of the surrounding cockpit, then the cockpit instrumentation, controls and other displays are not usable. Conversely, computer generated images of out-of-the-window scenes in real time are necessary for realistic training. Large video visual displays often have expensive, heavy glass mirrors or reflective surfaces and costly projectors with limited lumen capabilities. With the present invention, the user can view real time computer generated images or the actual environment while the helmet is in place on the user's head.

Other drawbacks of prior art helmet mounted displays are the poor visual resolution and the size and weight of the display components which often restrict freedom of movement of the user's head, reducing comfort and realism. Since the helmet or head mounted displays require a wire connection to the image generator, in the past, picture quality is greatly diminished as a function of the length of the wire distance between the helmet and the image generator.

The present invention overcomes problems found in current head and helmet mounted systems by providing a high quality video optic display that allows real world see-through with high light transmission factors for increased optical clarity, a collimated stereoscopic computer generated image view and improved signal amplification and other optic improvements.

SUMMARY OF THE INVENTION

A head mounted visual image display system to allow the user to observe computer generated images for creating a simulated environment. The head mounted display system includes a portable on board visual display mounted in a helmet and a remote electronics control unit in a housing containing the video processing circuitry tethered electrically to the helmet display.

The helmet has attached thereto a pair of cathode ray tubes, one for each eye, solid optics blocks, one for each CRT, that collimates the generated CRT images to infinity while allowing see-through vision for the user, liquid crystal shutters for color definition and a pair of video amplifiers, one connected to each CRT mounted on the helmet. The helmet has mounted thereon a head tracking sensor and an angular movement rate sensor for detecting where the user is looking and the rate of angular (side-to-side) head movement.

One of the remote electronics control unit (ECU) inputs is connectable to a conventional video image generator. The ECU outputs include the right and left video deflection signals for the helmet CRTs, head position attitude vector and rate sensing in an embedded PC system that is connected by a conductive tethered cable to the visual display equipment in the helmet. Left and right refer to the system components with the left and right eyes of the user.

The helmet has attached thereto two independent CRTs, two solid optics block supports, one for each CRT and each solid optics block (one for each eye) and manual mechanical adjustments for lateral (pupil separation), vertical, and eye relief (in and out) positioning of the solid optics blocks relative to the user's eyes.

The head tracking unit has circuitry contained in the ECU and utilizes helmet mounted magnetic sensors that communicate with the electronics control unit to generate continuous information regarding head position in six degrees of freedom to determine the user's head position and therefore, the direction the user is looking. The visual image generated in each CRT is spatially adjusted such that the user sees the appropriate real time display when looking in a particular direction measured by the head tracker. The head tracking system is based on magnetic information from the sensors. Angular head movement is sensed to prevent color aliasing in the CRT image.

Two 28 mm diameter black and white CRTs (one for each eye) are connected by a manually adjustable positioning support assembly to the helmet. The longitudinal axis of each CRT is substantially vertically oriented relative to the helmet body. Each CRT uses a raster scan image and receives video image, computer generated input signals from a video amplifier card that is also mounted on the helmet. By mounting the video amplifier card next to the CRT on the helmet, the input video signal cable length, tethered from the electronics control unit can be greatly increased to allow more freedom of movement and a greater area of user movement relative to the stationary electronics control unit. If the video amplifier card were mounted in the remote stationary independent electronics control unit, as the input video signal cable length increased, the video signal would be diminished, reducing video image quality. The video amplifier cards mounted on the helmet are connected by separate input conductor wires to a right video/deflection and left video/deflection selection respectively mounted in the ECU. Each CRT is connected to a high voltage power source through a power cable connected between the static electronics control unit and the helmet. The CRT scan format can be up to 1280 pixels, 1024 lines at 60 Herz field rate.

Each CRT is constructed with a coherent fibre optic face plate that acts as the display screen for the CRT, including a gray phosphor surface. The coherent fibre optics strands are all parallel and arranged in a straight, side-by-side array from a curved inner phosphor surface, with a 33 mm radius, to reduce mapping distortion induced by the CRT and computer image generator. Image distortion is also reduced in the yoke deflection in the electronics control unit. Typically, each fibre strand is 3 microns in diameter. The face plate has essentially a concave inner surface and a convex outer surface for reducing the mapping distortion inherent in the display.

Adjacent to each CRT face plate is a liquid crystal field sequential shutter. Each CRT displays a black and white non-color image. Each CRT image is projected through each LC shutter to generate the three primary colors of the visual image, red, green and blue, in rapid sequence through wide angle collimated optic eye pieces. The viewer's eyes visually converge the red, green and blue colors into a high resolution collimated full color image.

Each visual image is transmitted from the LC shutter to a solid optics block that includes a segmented spherical mirror, for collimating light rays to infinity and a vertically polarized beam splitter of high transmissivity characteristics for brightness in the optical path to the CRT. Optically the display system can provide stereoscopic, dual eye point imagery with a field of view (FOV) up to 80 degrees horizontally and 40 degrees vertically.

Each solid optics block (one for each CRT) constitutes a six sided cube with one side having the spherical mirror internally. The light rays from the CRT screen image pass through a beam splitter and are reflected by the mirror and beam splitter to the eye of the user. Another optical path, directly in line with the viewer's line of sight, permits "see-through transmissivity".

Each solid optics block also includes an optical barrier to provide anti-luning due to the stereoscopic imagery provided by a display for each eye. Luning is an optical/physiological condition that occurs in a stereoscopic image system having two separate images produced, one for each eye. The brain interprets areas of visual image overlap causing an apparent visible optical unwanted stimulus. Each solid optics block in the present invention includes a strategically sized and placed optical barrier in the optical path of the user to prevent luning. A small barrier such as a piece of tape or opaque coating can be employed. The anti-luning optical barrier is affixed permanently to one face of each solid optics block, closest to the eye of the user. The image as stereoscopically viewed by the user will not perceive the luning phenomenon because of the optical barriers.

The electronics control unit is a remote stationary unit, separated from the helmet, in a protective cabinet or housing that includes an imbedded PC system having a CPU and ethernet. The electronics control unit also includes an analog IO board and a power supply along with rate sensor electronics that is coupled to a rate sensor input that allows the visual CRT image to be spatially adjusted to compensate for the speed of moving the helmet when the head of the user moves. This is connected to the analog input board in the electronic control unit.

The present display system can be used with different types of computer image generating systems that provides digital image generation which connects as an input into the electronics control unit through the left video and right video channels maintained in the electronic control unit.

In operation, a suitable data base having the image scene data and a digital image generator provides digital image signals through the left and right deflection circuitry of the system. The electronics control unit processes the video signals to the left and right video amplifiers maintained on the helmet through the cables connecting the helmet and the electronics control unit. The visual display on the CRT face plate screen is projected through the liquid crystal shutter for color and reflected from a spherical mirror in the solid optics block. The user sees a collimated, stereoscopic real time image at infinity. When the video image is off, the user sees the actual world around the user through the beam splitter in each solid optics block. The head tracker on the helmet in conjunction with the head tracking circuitry and tracker transmitter continuously monitors the helmet orientation to determine the direction that the user is looking. Also a rate sensor provides angular helmet movement rate signals to the electronics control unit. This ensures that the image is continually synchronized with the user line of sight and to prevent color aliasing from angular head movement.

This system is capable of providing both virtual reality simulation and synthetic visual environments and allowing a real world view when necessary.

As an example of use in flight simulation, the user sits in a simulated aircraft cockpit that could include simulated aircraft cockpit instruments, control stick, throttles, and other cockpit objects such as fuse panels located in the cockpit required by a pilot for operating the aircraft. The helmet video display can provide to the pilot real time, out-of-the window computer images while the pilot is sitting in the cockpit looking outside the cockpit through the aircraft windows. The pilot can also visually monitor the cockpit gauges such as engine temperatures, thrust settings, air speed, and altitude with the helmet mount display in place on the pilot's head.

The head mounted display has application in all types of simulation, including but not limited to, flight training, military training for a nap-of-the-earth and low level flight, combat, and aerial refueling. Also it can be used for entertainment or video games and telepresence applications for providing synthetic environments.

It is an object of this invention to provide an improved head mounted display for providing simulation and synthetic scenery optically to the user.

It is another object of this invention to provide an improved head mounted display for virtual reality that allows for a collimated stereoscopic image and see-through capability for the user.

It is another object of this invention to provide a helmet mounted display for simulated images from a computer of high resolution that allows the helmet to be tethered on a long cable from the electronic processing unit.

And yet still another object of the invention is to provide a visual display with stereoscopic images that eliminates anti-luning.

In accordance with these and other objects which will become apparent hereinafter, the instant invention will now be described with particular reference to the accompanying drawings.

PREFERRED EMBODIMENT OF THE INVENTION

Figure 1:
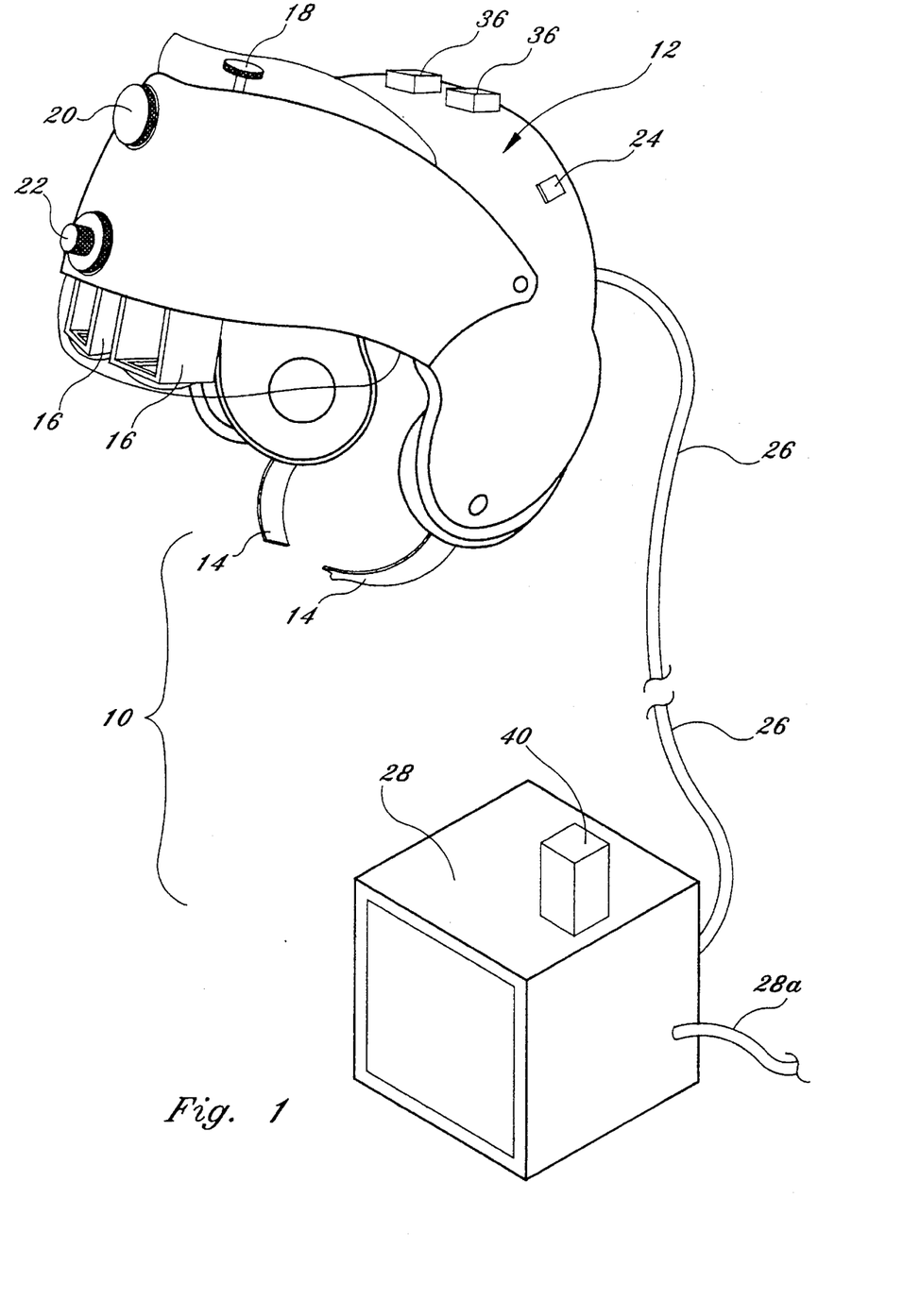
FIG. 1 shows a perspective view of the present invention, including the helmet and a cabinet for housing the electronics control unit.

Referring now to the drawings, and in particular FIG. 1, the present invention is shown at 10 comprised of a helmet 12 that is electrically connected by multiple electrical conductors 26 to a stationary electronics control unit 28. The artificially generated display screen (CRT) and solid optics blocks are mounted in tubular frame supports 16 which are adjustably connected to helmet 12. The supports 16 can be adjusted positionally relative to the user's eyes by the manipulation of three separate control knobs 18, 20, and 22 which are connected to movable members inside the helmet, which allows each display screen support 16 to be moved laterally relative to each other for pupil separation, vertically together and in and out (either toward or away from the eyes of the user). Essentially, turning knob 18 moves the display screen vertically, knob 20 moves the display screen in and out, and knob 22 moves each display screen for each eye laterally towards each other or away from each other.

The helmet also has a sensor 24 that is utilized in conjunction with a head tracking unit 40 (including a transmitter) that allows the system to determine instantaneously where the user is looking by virtue of the position of the helmet 12 relative to the head tracking unit 40. The head tracking unit also contains an angular rate sensor in the helmet to compensate for head movement from side-to-side of the user with respect to the artificial image being generated. As the user's head moves angularly, the generated image scene must also move for correct line of 'sight from the user's viewpoint. Angular tracking prevents erratic image movement and color aliasing.

The helmet 12 is made of a suitable lightweight, rigid material for supporting the equipment and for comfort and may include paddings and a strap 14 for securing the helmet in the proper position on the user's head. The helmet also contains video amplifier circuitry represented schematically by blocks 36, one for each CRT, that is described in greater detail below. The electronics control unit 28 also includes input 28a from a conventional image generator (not shown). The head mounted display system shown in FIG. 1 can be connected to a variety of different image generators through an input such as 28a that connects it into the electronics control unit contained in housing 28.

Figure 2:
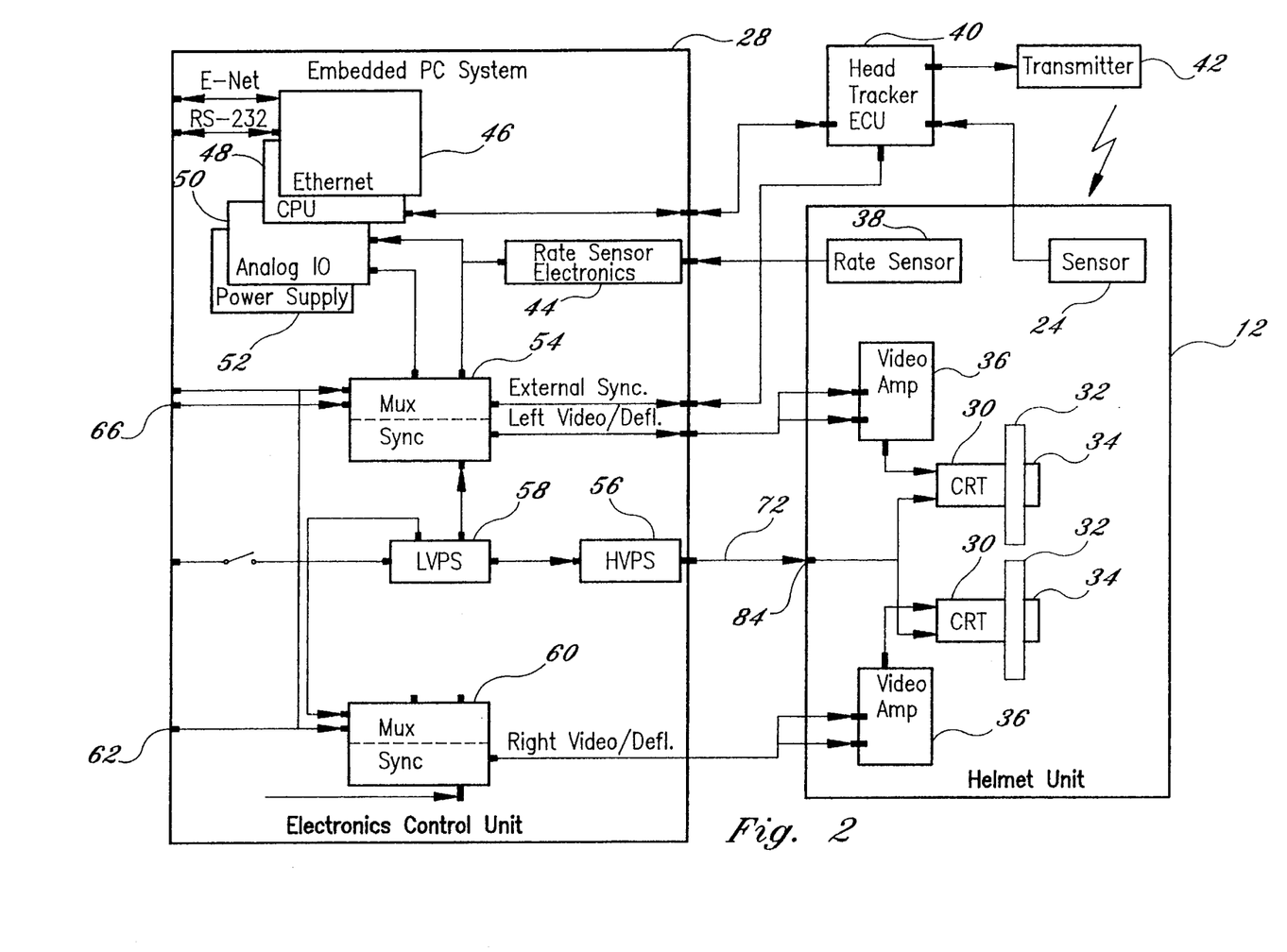
FIG. 2 shows a circuit block diagram of the present invention.

Referring now to FIG. 2, the helmet 12 contains two cathode ray tubes 30 having 28 mm diameter projection screen face plate, a liquid crystal display color generating shutter 32 mounted adjacent the screen of the CRTs, and a solid optics block unit 34 which is described below. Each CRT has its own video amplifying circuitry 36 mounted on the helmet and connected electrically thereto which greatly improves picture resolution, allowing the helmet to be tethered electronically to the electronics control unit 28 in the housing remotely separated from the helmet 12 by sufficiently long cables without reducing picture quality. Due to the fact that the video amplifiers 36 are mounted adjacent to the CRT in the helmet 12 and are not remotely located in the electronics control unit 28, the picture quality is not materially degraded. The helmet 12 also contains a magnetic head tracking sensor 24 that is connected by a conductor to head track unit 40 that is connected to the CPU 48 in the electronics control unit. Also, an angular rate sensor 38 is mounted in the helmet 12 and is connected to rate sensor electronics mounted in the electronics control unit by a cable.

The electronics control unit 28 has an embedded PC system that includes a CPU 40, ethernet 46, analog input/output 50, and power supply 52. The electronics control unit 28 is also ported to an image generator at port 66 and 62 which receive input image generator signals for the left CRT and right CRT through mux and synchronization 54 and 60. The output of the mux/synch 54 and 60 are then routed by cable to provide left video and right video deflection to the video amplifiers 36 mounted in the helmet 12.

The electronics control unit 28 also has a low voltage power supply 58 and high voltage power supply 56 which is connected through power supply cable at 72 to the helmet at 84 to supply high voltage power to the helmet and particularly to each CRT in the helmet.

The electronics control unit 28 also contains rate sensor electronics circuitry 44 which is connected to the analog input/output 50 and the mux synchronization boards 54 and 60. The rate sensor 38 in the helmet, in conjunction with the rate sensor electronics circuitry 44, thus allows the video display to be adjusted to compensate for side-to-side head movement of the user so that the image does not have color aliasing induced by rapid angular head movement.

The head tracker 40 includes a transmitter 42 that works in conjunction with a sensor 24 in the helmet 12 and CPU 48 so that the CRT image corresponds to the direction that the user is looking. The electronic conductor wires and connections between the electronic control unit 28 and the helmet unit 12 shown in FIG. 2 are represented by the single cable 26 shown in FIG. 1 that includes several conductors for the power supply and video pictures and the head tracker. The different conductors can all be mounted in a single appearing cable connected between the helmet and the electronic control unit 28.

Figure 3:
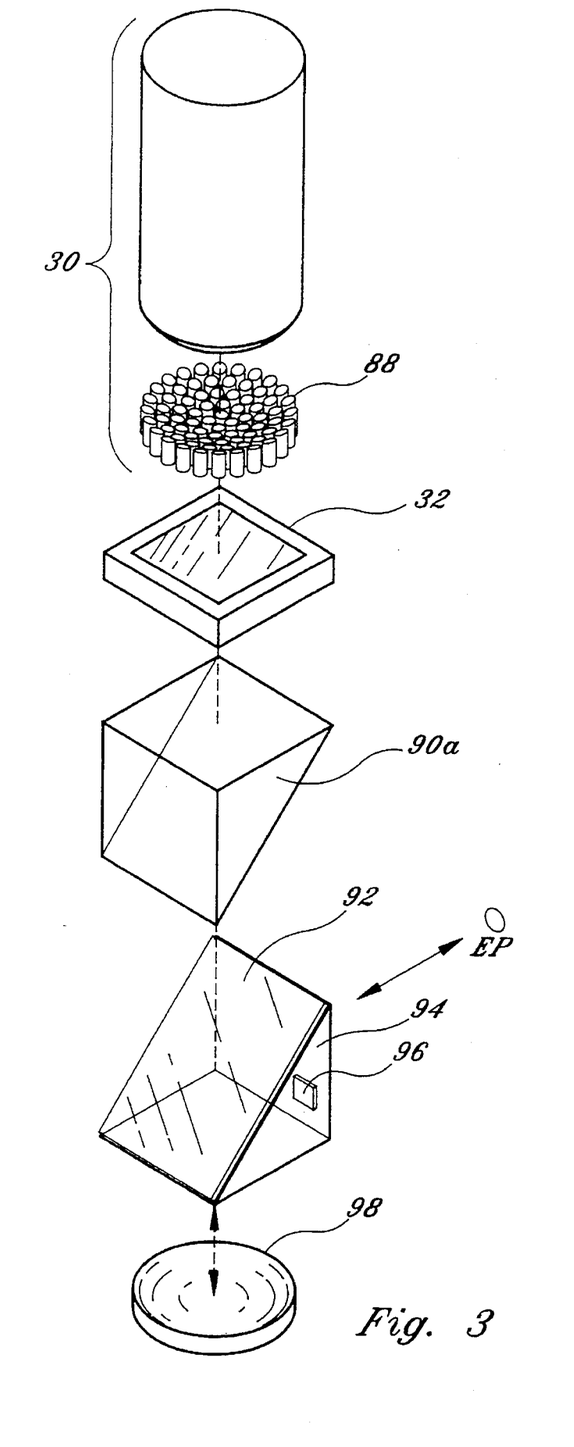
FIG. 3 shows a perspective exploded view of the optics and CRT utilized in the present invention.

FIG. 3 shows the essential components used in the video display and optics which includes the same unit for each eye. A cathode ray tube 30 produces a black and white video display on a 28 mm diameter screen face plate. In order to eliminate distortion, the CRT screen face plate is comprised of a coherent fibre optic array. The face plate contains a plurality of parallel straight fibre optics 88 in a linear side-by-side array of different lengths so that the face plate 88 has a variable thickness that compensates for distortion on the CRT curved screen to eliminate mapping distortions in the screen image. The inside surface is concave and the outside surface is convex, acting as a lens for distortion correction. The fibers are approximately 3 microns in diameter and are parallel and straight to preserve collimation. The use of the face plate 88 by having a variable thickness or length of fibre optic elements eliminates the need for mapping compensation in the CRT picture display. The face plate 88 is the screen of the CRT and has a gray phosphor coating on the inside surfaces of the fibre optics elements.

The black and white picture from the face plate 88 is transmitted through a liquid crystal shutter 32 that is electrically connected to the electronics control unit 28 to provide color signals that are polarized in order to enhance the black and white CRT display image with color. The enhanced color image from shutter 32 enters solid optic block 90 and specifically cube half 90a that forms half of the solid cube optics block 90 used with the invention. A cube half 94 forms the other half of the solid optics cube block. A partially reflective coating 92 is applied to one face of cube half 94 to provide a beam splitter along the surface of the diagonal of cube half 94. The beam splitter may also provide for vertical polarization for improved optical transmissivity. After the coating 92 is applied to the cube half 94, cube half 90 is attached thereto by adhesive, forming a solid optics cube. A reflecting concave mirror 98 is also glued to the bottom face of cube half 94. As shown in FIG. 3, image light rays are transmitted from the CRT face plate 88 through the video color shutter 32 and the solid optics block formed from block halves 90 and 94 where the image is collimated (reflected) by mirror 98 back into the lower half cube 94 where the image is reflected by coating 92 to the user's eye. An anti-luning optical barrier 96 is also affixed to the outside face of cube half 94 to prevent luning due to the stereoscopic effect of having two separate solid optics blocks. The user eye point EP, as shown in FIG. 3, receives a collimated image generated by the CRT, in color, reflected from mirror 98 and from beam splitter coating 92 to the eye point EP of the user. The image display shown in FIG. 3 is provided for each eye of the user with independent CRTs, solid optics blocks, and mirrors. Each solid optics block 90 can be position adjusted relative to the eyes of the user as explained below. The CRT and face plate, the LC color shutter, the solid optics block, and the mirror are all mounted together in a single molded tubular support that is affixed to the helmet through adjustable support members.

Figure 4:
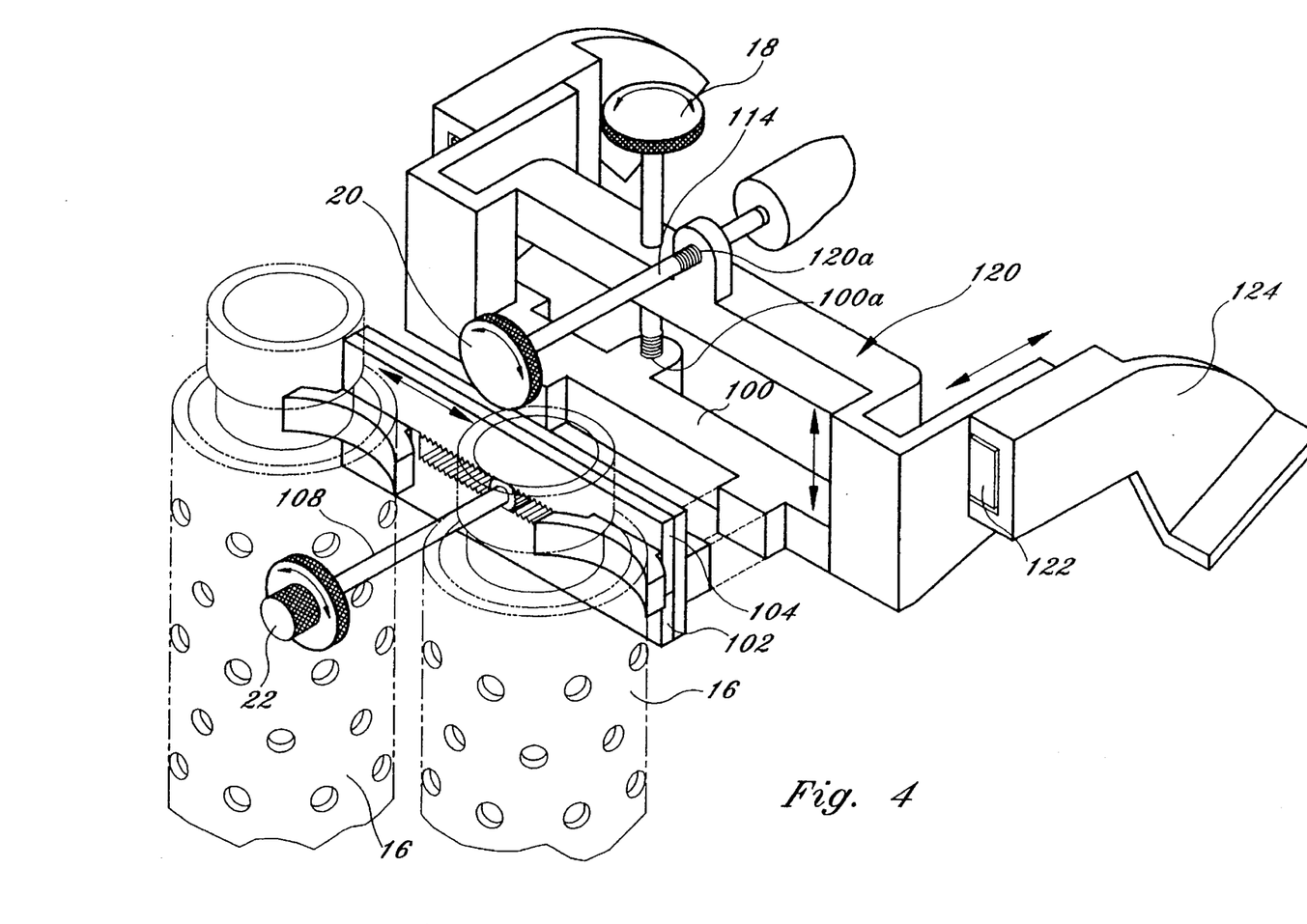
FIG. 4 shows a perspective view of the single point control for adjusting the position of the optic cubes relative to the user's eyes, which is affixed to the helmet body.

FIG. 4 shows the single point adjustment for moving each of the image displays relative to each user eye. The adjustable movement of each optical tubular support 16 will be described. The image display described in FIG. 3 is mounted in a separate support 16, one for each eye, which are attached to a movable, adjustable support that is attached to the helmet. To move the image display supports 16 laterally, closer or away from each other, manual knob 22 is connected to shaft 108 that includes a movable gear that slides threaded member 102 and 104 in lateral directions away from or towards each other so that the CRT and solid optics block in housing 16 can be moved for adjusting the distance between the eyes of the user. As a unit, both supports 16 can be moved toward or away from the eyes of the user by rotating knob 20 which is connected to a threaded shaft 114 that moves the entire support member 120 forward or backward in threaded aperture 120a, relative to the eyes of the user. The support member 120 slides in a track 122 in supports 124 connected to helmet 12 that allows member 120 to move forward or backward in order to adjust the focal distance of the user and the distance from the solid optics blocks in supports 16 from the eyes of the user. Finally, the image display can be adjusted vertically by moving and rotating knob 18 connected to a threaded shaft 118 that also is connected to the mounting frame 100 and threaded aperture 100a that allows support member 100 to move vertically up and down, causing the tubular supports 16 to move.

Figure 5:
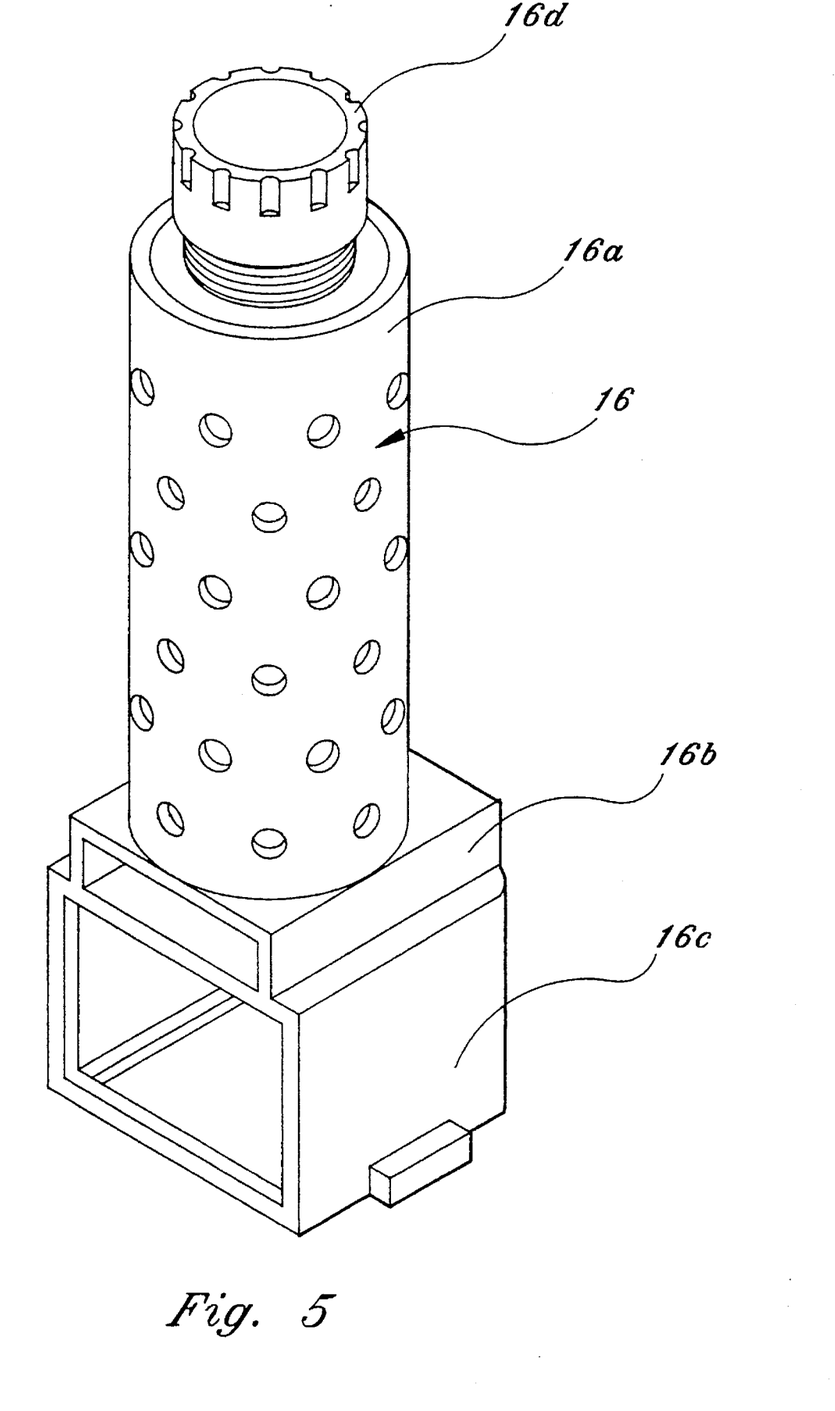
FIG. 5 shows the molded support that houses the CRT and the solid optics block utilized in the present invention.

FIG. 5 shows a perspective view of a molded tubular support 16 that contains the CRT, LC shutter, and solid optics block shown in FIG. 3. The display support 16 has an upper tubular segment that has the CRT mounted therein and a lower rectangular-shaped frame 16b that contains the liquid crystal color shutter, a cub-shaped frame 16c that contains the solid optics block and mirror, and the face plate which is mounted against the CRT screen. The support 16 has numerous apertures throughout in order to reduce the weight and may be made of a lightweight rigid plastic. By mounting the CRT and solid optics blocks in one support 16 for each eye, the complete compact display is stabilized and can be moved as shown in FIG. 4 for positioning the optics block at the proper position relative to the user's eyes. At the upper end of the tubular column 16a of support 16, attached threadably thereto is an end connector 16d that can be used to house the end portion of the CRT mounted within the tubular column 16a.

EXAMPLE

As an example of the head mounted display, the field of view and stereo overlap would be 80° horizontally by 40° vertically with a 25° overlap. The pupil brightness would be 6 foot-Lamberts minimum. The resolution will be up to 2.65 arc minutes per optical line pair. The scan format will be 1,280 pixels, 1,024 lines at 30 Herz interlaced. The image generator input can be from an RS-343/RS-170 180 Herz red, green, blue or field sequential video. The sensor imagery that can be provided includes forward-looking infrared (FLIR) day television (DTV), low light television (LLTV), and night vision goggles (NVG). The see-through transmissivity is fifty percent. The eye relief allows that the user can wear standard aviator glasses in use. The helmet weight is 4.5 lbs. The helmet can withstand a minimum of 3.5 g's. The on-helmet components include a pair of liquid crystal, field sequential shutters, gray phosphor CRT displays with the fibre optic face plate. The result, using wide-angle collimated solid optics eye pieces stereoscopically, provides the viewer's eyes visually to converge the red, green, and blue colors into a very clear, high resolution, full color image. The helmet includes a magnetic head tracker in which the head position and attitude are precisely measured in 6° of freedom. Appropriate imagery viewpoints for each eye are generated from the combined positions and attitudes of the user's head and the simulated vehicle, such as an aircraft.

Off-helmet components include advanced video, synchronization, and power supply electronics. The input to the electronics control unit from the image generator can be composite video or separate horizontal and vertical synchronization signals.

In summary, to operate the invention image generator with a suitable database is selected for connection to the electronics control unit 28. With power supplied to the system in conjunction with the head tracker and angular sensor, a visual video scene is generated through the CRTs to the user, providing a collimated stereoscopic realistic image. Because of the high light transmissivity of the solid optics block for each eye and the resolution of the CRT and optics system, a realistic image is presented in accordance with the database scene provided. The system also provides see-through with a high light transmissivity when the video image is not displayed on the CRT. With the video amplifiers in the helmet 12 (FIG. 1), the attaching cable can be made quite long (at least 15 feet) from the electronics control unit without picture degradation. Anti-luning is provided based on optical barriers in the solid optics block. The system is extremely lightweight and comfortable, adding to the realism.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A head mounted display for receiving images, comprising:

remote electronics control unit;

helmet means for mounting a portable visual image display on a user's head;

a first cathode ray tube (CRT) connected to said mounting means, said first CRT having a display screen;

first solid optics block mounted in optical communication with the screen of said first CRT, said first optics block having a first optical light path that includes a concave mirrored reflecting surface and a beam splitting surface such that the image light along said optical first path is transmitted goes from the CRT screen through the beam splitting surface to the mirrored reflecting surface back to the beam splitting surface where it is reflected from the beam splitter directly to the observer's eye, said solid optics block including a second optical path that allows direct transmission of light rays from outside said solid optics block directly into the eye of the viewer through said beam splitter;

means connected to said CRT for generating a video image on said first CRT;

video image generating circuit means mounted in said remote electronics control unit;

signal conducting means connected between said remote electronics control unit and said helmet means for communicating video image generated signals between said remote electronics control unit and said first CRT, whereby said helmet mounted display can generate synthetic images for viewing by the observer wearing the helmet means in a first mode and allow see-through viewing by the user in a second mode;

a second cathode ray tube (CRT) connected to said helmet means;

second solid optics block disposed in optical communication with the screen of said second CRT, said second optics block including a beam splitting surface and a reflecting curved surface for collimating light rays, said first CRT and said second CRT and said first solid optics block and said second optics block individually aligned relative to the line of sight of the user's eyes independently, whereby the first and second visual displays provide a collimated stereoscopic image; and a first and second plate for correcting optical distortion including a fibre optic bundle having a plurality of parallel, straight, side-by-side fibre optical members, said plate first end being concave to fit flush against said first and second CRT faces and said first and second plates second ends being convex, said fibre optic plates correcting mapping distortion on said first and second CRT curved surfaces.

2. A head mounted display as in claim 1, wherein:

said first solid optics block and said second solid optics block include optic barriers to prevent luning.

3. A head mounted display as in claim 1, including:

means connected to each of said first and second solid optics blocks and said helmet means for adjustably positioning each of said first and second solid optics blocks relative to the user's eyes vertically, laterally for pupil separation, and toward and away from the eye of the user.

4. A head mounted display as in claim 1, including:

video amplifying circuit means mounted and attached to said helmet and electrically connected to each of said CRTs mounted to said helmet and connected by a tethered cable to said electronics control unit, thereby increasing the useful length of said tethered cable without degrading picture quality.

5. A head mounted display as in claim 1, including:

each of said reflecting mirrors providing for an image at infinity relative to the eye point of the user to create a collimated image stereoscopically.

* * * * *